(12) United States Patent
Morgan et al.

(10) Patent No.: US 7,100,357 B2
(45) Date of Patent: Sep. 5, 2006

(54) SYSTEM FOR CONTROLLING GAS TURBINE BY ADJUSTING A TARGET EXHAUST TEMPERATURE

(75) Inventors: Rex Allen Morgan, Simpsonville, SC (US); Timothy Andrew Healy, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 186 days.

(21) Appl. No.: 11/075,756

(22) Filed: Mar. 10, 2005

(65) Prior Publication Data
US 2005/0257514 A1    Nov. 24, 2005

Related U.S. Application Data

(62) Division of application No. 10/600,335, filed on Jun. 23, 2003, now Pat. No. 6,912,856.

(51) Int. Cl.
*F02C 9/00* (2006.01)
(52) U.S. Cl. .................................................. 60/39.281
(58) Field of Classification Search ............... 60/39.24, 60/39.281, 803
See application file for complete search history.

(56) References Cited

U.S. PATENT DOCUMENTS

| | | | | |
|---|---|---|---|---|
| 3,638,422 A | * | 2/1972 | Loft et al. | 60/39.281 |
| 3,750,465 A | * | 8/1973 | Howell et al. | 73/117.3 |
| 3,902,315 A | * | 9/1975 | Martin | 60/39.281 |
| 5,622,042 A | * | 4/1997 | Mirsky et al. | 60/39.281 |
| 5,761,895 A | | 6/1998 | Chu et al. | |
| 2002/0083712 A1 | | 7/2002 | Tomlinson et al. | |
| 2002/0106001 A1 | | 8/2002 | Tomlinson et al. | |

OTHER PUBLICATIONS

A.J. Volponi, "Gas Turbine Parameter Corrections", Journal of Engineering for Gas Turbines and Power, Copyright © 1999 by ASME, Oct. 1999, vol. 121, pp. 613-621.
D. Johnson et al, "SPEEDTRONIC™ Mark V Gas Turbine Control System", pp. 1-18.
J. Kure-Jensen et al, "SPEEDTRONIC™ Mark V Steam Turbine Control System", © 1996 GE Company, pp. 1-15.
Roointon Pavri et al, "Gas Turbine Emissions and Control", GE Power Systems GER-4211 (Mar. 2001), pp. 1-32.
Walter Barker et al, "SPEEDTRONIC™ Mark VI Turbine Control System", GE Power Systems GER-4193A (Oct. 2000), pp. 1-14.

* cited by examiner

*Primary Examiner*—Louis J. Casaregola
(74) *Attorney, Agent, or Firm*—Nixon & Vanderhye, P.C.

(57) ABSTRACT

A system for determining a target exhaust temperature for a gas turbine including: determining a target exhaust temperature based on a compressor pressure condition; determining a temperature adjustment to the target exhaust temperature based on at least one parameter of a group of parameters consisting of specific humidity, compressor inlet pressure loss and turbine exhaust back pressure; and adjusting the target exhaust temperature by applying the temperature adjustment.

20 Claims, 4 Drawing Sheets

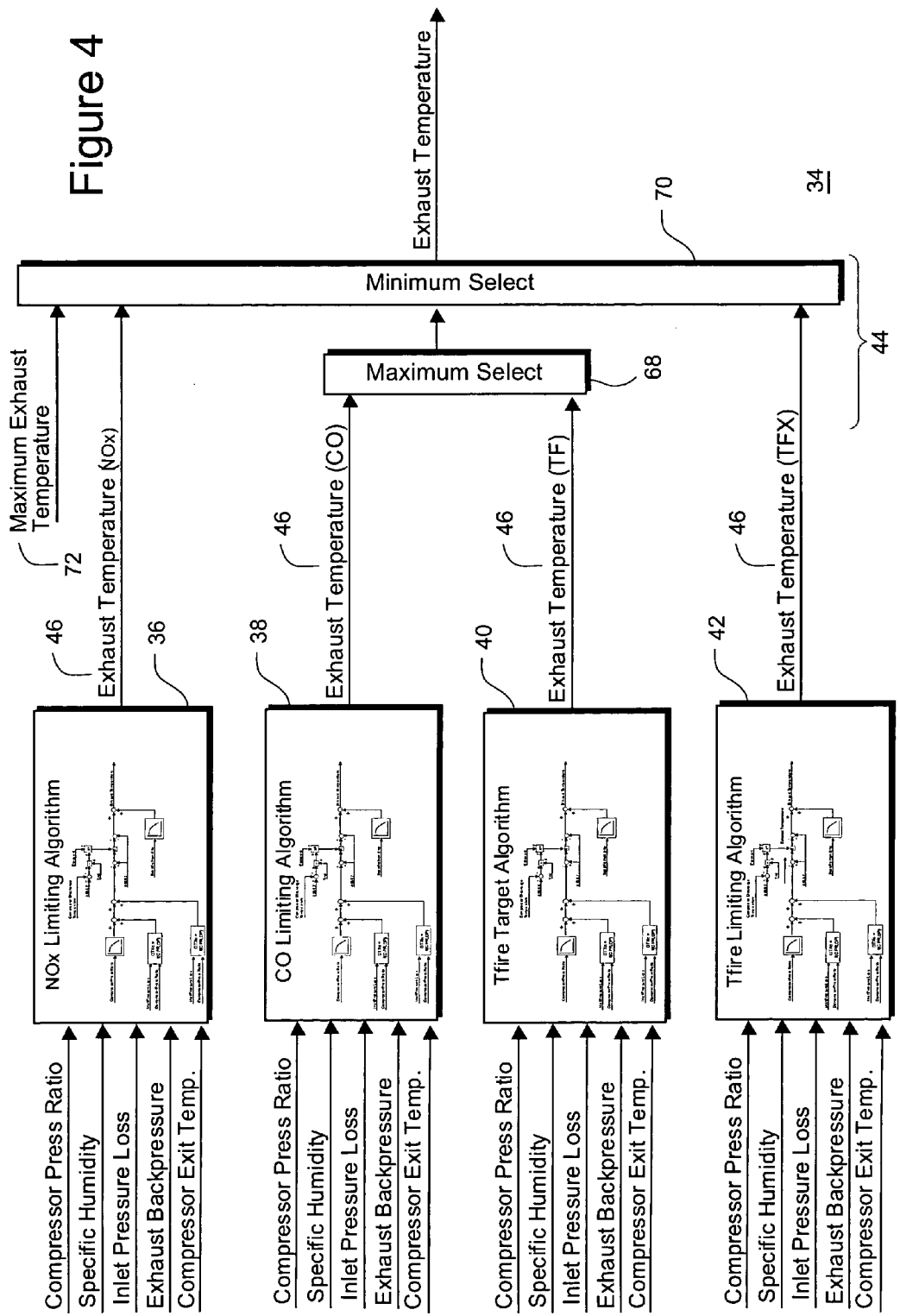

SYSTEM FOR CONTROLLING GAS TURBINE BY ADJUSTING A TARGET EXHAUST TEMPERATURE

CROSS RELATED APPLICATION

This application is a divisional of and claims priority to U.S. patent application Ser. No. 10/600,335 filed Jun. 23, 2003 now U.S. Pat. No. 6,912,856.

BACKGROUND OF THE INVENTION

The present invention relates generally to controllers for a combustion system for a gas turbine. In particular, the invention relates to a combustor control algorithm for a Dry Low NOx (DLN) combustor.

Industrial and power generation gas turbines have control systems ("controllers") that monitor and control their operation. These controllers govern the combustion system of the gas turbine. To minimize emissions of nitric-oxides (NOx), DLN combustion systems have been developed and are in use. Control scheduling algorithms are executed by the controller to operate DLN combustion systems. Conventional DLN algorithms receive as inputs measurements of the exhaust temperature of the turbine and of the actual operating compressor pressure ratio. DLN combustion systems typically rely solely on the turbine exhaust temperature and compressor pressure ratio to determine an operating condition, e.g., turbine exhaust temperature, of the gas turbine.

Conventional scheduling algorithms for DLN combustion systems do not generally take into account variations in ambient operating conditions, such as seasonal variations in ambient air temperature and humidity. Similarly, conventional scheduling algorithms do not account for variations due to compressor inlet pressure loss and variations in the exhaust back pressure of the turbine. Rather, conventional scheduling algorithms generally assume that ambient conditions, e.g., humidity, compressor inlet pressure loss and turbine back pressure remain at certain defined conditions or that variations in these conditions do not affect the target exhaust turbine temperature.

DLN combustion systems for gas turbines generally are sensitive to ambient conditions, such as outside ambient humidity. Seasonal variations in humidity can affect the operation of a DLN combustion system. As the ambient conditions change with the seasons, the settings of DLN combustion systems are often manually adjusted to account for ambient seasonal variations. In addition, compressor inlet pressure loss and turbine back pressure may drift from the loss and pressure levels used to define the DLN combustion settings. The $NO_x$ and carbon monoxide (CO) emissions from the gas turbine may increase beyond prescribed limits, if the conventional DLN combustion system is not adjusted as the seasons change or to compensate for variations in the compressor inlet pressure or turbine back pressure.

There is a long felt need for a combustion system controller, and especially a DLN controller, that accommodates seasonal variations in ambient conditions and changes in the inlet pressure and exhaust back pressure. Similarly, there is a long-felt need for a controller that reduces the need to manually adjust the DLN combustion controller of a gas turbine to account for seasonal fluctuations in ambient conditions, and for changes in the inlet pressure loss and turbine back pressure.

BRIEF SUMMARY OF THE INVENTION

In a first embodiment, the invention is a method for determining a target exhaust temperature for a gas turbine including: determining a target exhaust temperature based on a compressor pressure condition; determining a temperature adjustment to the target exhaust temperature based on at least one parameter of a group of parameters consisting of specific humidity, compressor inlet pressure loss and turbine exhaust back pressure; and adjusting the target exhaust temperature by applying the temperature adjustment.

In another embodiment, the invention is a method for determining a target exhaust temperature for a gas turbine comprising: determining a target turbine exhaust temperature based on a compressor schedule having as an input compressor pressure ratio and as an output target turbine exhaust temperature; adjusting the output target turbine exhaust temperature to compensate for a load condition of the gas turbine; determining a temperature change to be applied to the output target turbine exhaust temperature wherein the temperature change is derived from at least one parameter of a group of parameters consisting of specific humidity, compressor inlet pressure loss and turbine exhaust back pressure; changing the target exhaust temperature by the temperature change, and controlling the gas turbine based on the changed target exhaust temperature.

In a further embodiment, the invention is a controller in a gas turbine having a compressor, combustor and turbine, where the controller comprises: a sensor input receiving data regarding an actual turbine exhaust temperature, a compressor pressure ratio level, a compressor pressure inlet loss, a turbine back pressure level and ambient humidity; a processor executing a program stored in the controller, wherein said program further comprises: a compressor versus turbine exhaust temperature schedule for generating a first target exhaust temperature based on the compressor pressure ratio level, and at least one additional schedule for generating a temperature change to be applied to the target turbine exhaust temperature wherein the temperature change is derived from at least one parameter of a group of parameters consisting of specific humidity, compressor inlet pressure loss, and the turbine back pressure level, and wherein said processor outputs a modified target exhaust temperature based on the first target exhaust temperature and the temperature change, and a combustion controller which outputs a combustor control signal based on the modified target exhaust temperature.

BRIEF DESCRIPTION OF THE DRAWINGS

The accompanying drawings in conjunction with the text of this specification describe an embodiment(s) of the invention.

FIG. 4 is a block diagram of a selection process for determining a target exhaust temperature.

DETAILED DESCRIPTION OF THE INVENTION

Figure 1:
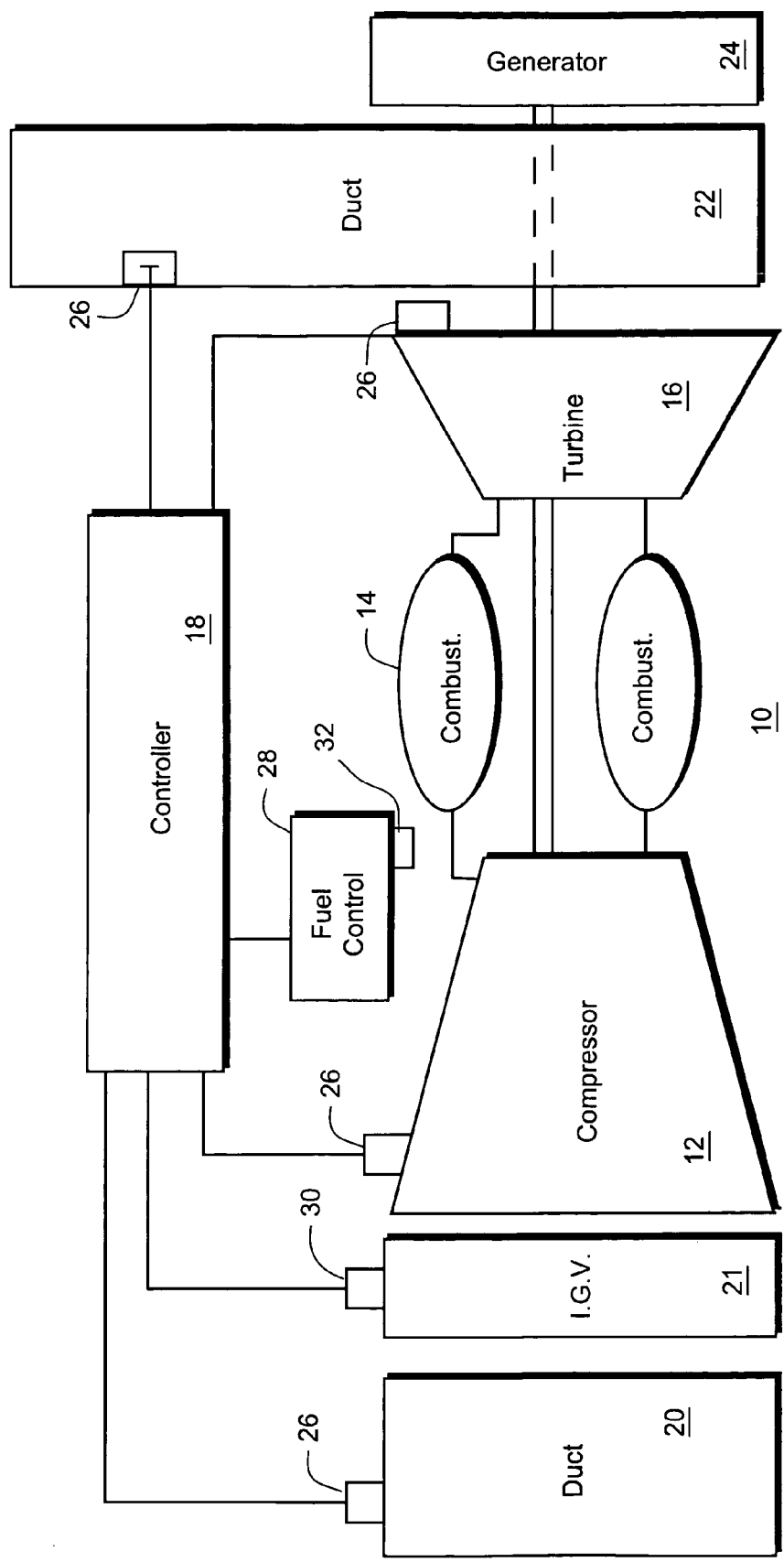
FIG. 1 is a schematic depiction of a gas turbine having a fuel control system.

FIG. 1 depicts a gas turbine 10 having a compressor 12, combustor 14, turbine 16 drivingly coupled to the compressor and a control system 18. An inlet 20 to the compressor feeds ambient air and possibly injected water to the compressor. The inlet may have ducts, filters, screens and sound absorbing devices that each may contribute to a pressure loss of ambient air flowing through the inlet 20 into the inlet guide vanes 21 of the compressor. An exhaust duct 22 for the turbine directs combustion gases from the outlet of the turbine through ducts having, for example, emission control and sound absorbing devices. The exhaust duct 22 applies a back pressure to the turbine. The amount of back pressure may vary over time due to the addition of components to the duct 22, and to dust and dirt clogging the exhaust passages. The turbine may drive a generator 24 that produces electrical power. The inlet loss to the compressor and the turbine exhaust pressure losses tend to be a function of corrected flow through the gas turbine. Accordingly, the amount of inlet loss and turbine back pressure vary with flow through the gas turbine.

The operation of the gas turbine may be monitored by several sensors 26 detecting various conditions of the turbine, generator and environment. For example, temperature sensors may monitor ambient temperature surrounding the gas turbine, compressor discharge temperature, turbine exhaust gas temperature, and other temperature measurements of the gas stream through the gas turbine. Pressure sensors may monitor ambient pressure, and static and dynamic pressure levels at the compressor inlet and outlet, and turbine exhaust, as well as at other locations in the gas stream. Further, humidity sensors, e.g., wet and dry bulb thermometers, measure ambient humidity in the inlet duct of the compressor. The sensors 26 may also comprise flow sensors, speed sensors, flame detector sensors, valve position sensors, guide vane angle sensors, or the like that sense various parameters pertinent to the operation of gas turbine 10. As used herein, "parameters" and similar terms refer to items that can be used to define the operating conditions of turbine, such as temperatures, pressures, and flows at defined locations in the turbine that can be used to represent a given turbine operating condition.

A fuel control system 28 regulates the fuel flowing from a fuel supply to the combustor 14, a split between the fuel flowing into primary nozzles and the fuel mixed with air before flowing into a combustion chamber, and may select the type of fuel for the combustor. The fuel control system may be a separate unit or may be a component of a larger controller 18.

The controller may be a General Electric SPEED-TRONIC™ Gas Turbine Control System, such as is described in Rowen, W. I., "SPEEDTRONIC™ Mark V Gas Turbine Control System", GE-3658D, published by GE Industrial & Power Systems of Schenectady, N.Y. The controller 18 may be a computer system having a processor(s) that executes programs to control the operation of the gas turbine using sensor inputs and instructions from human operators. The programs executed by the controller 18 may include scheduling algorithms for regulating fuel flow to the combustor 14. The commands generated by the controller cause actuators on the gas turbine to, for example, adjust valves between the fuel supply and combustors that regulate the flow and type of fuel, inlet guide vanes 21 on the compressor, and other control settings on the gas turbine.

The controller 18 regulates the gas turbine based, in part, on algorithms stored in computer memory of the controller. These algorithms enable the controller 18 to maintain the NOx and CO emissions in the turbine exhaust to within certain predefined limits, and to maintain the combustor firing temperature to within predefined temperature limits. The algorithms include parameters for current compressor pressure ratio, ambient specific humidity, inlet pressure loss and turbine exhaust back pressure. Because of these parameters in the algorithms, the controller 18 accommodates seasonal variations in ambient temperature and humidity, and changes in the inlet pressure loss through the inlet 20 of the gas turbine and in the exhaust back pressure at the exhaust duct 22. An advantage of the including parameters for ambient conditions and for inlet pressure loss and exhaust back pressure is that the $NO_x$, CO and turbine firing algorithms enable the controller to automatically compensate for seasonal variations in gas turbine operation. Accordingly, the need is reduced for an operator to manually adjust a gas turbine to account for seasonal variations in ambient conditions and for changes in the inlet pressure loss or turbine exhaust back pressure.

The combustor 14 may be a DLN combustion system. The control system 18 may be programmed and modified to control the DLN combustion system. The DLN combustion control algorithms are set forth in FIGS. 2 to 4.

Figure 2:
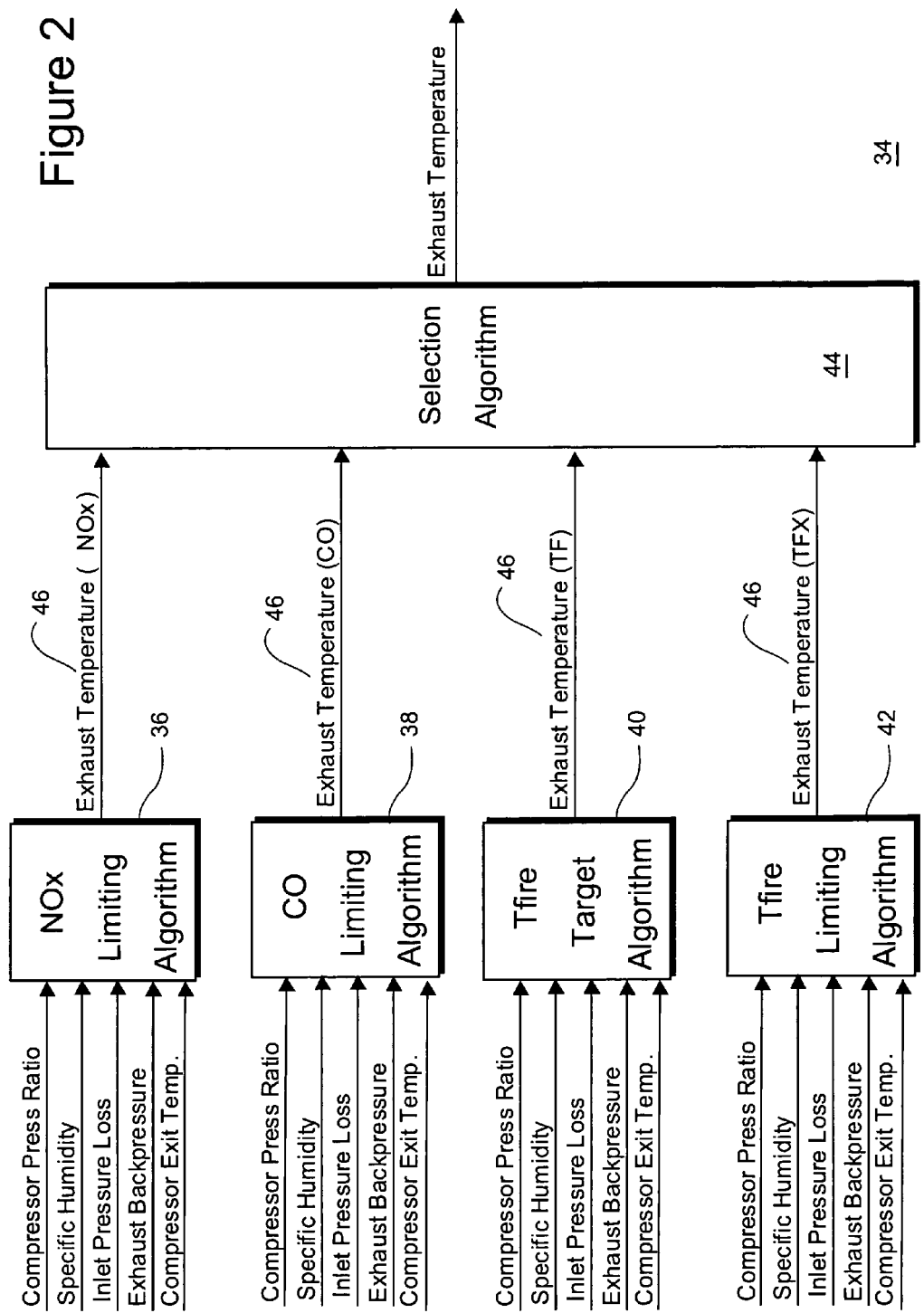
FIG. 2 is a block diagram of certain emission limiting and turbine firing algorithms applied to select a target turbine exhaust temperature.

FIG. 2 is a block diagram showing an exemplary process 34 for establishing a limiting turbine exhaust temperature based on a NOx (nitrous oxides) emission limiting algorithms 36, a Co (carbon monoxide) emission limiting algorithm 38, a target turbine firing temperature (Tfire) algorithm 40, and a Tfire limiting algorithm 42. These algorithms 36, 38, 40 and 42 each output a separate desired turbine exhaust temperature. The process 34 includes a selection logic 44 to select one of the input desired exhaust temperatures. The process 34 may be used to maintain turbine emissions and firing temperature at or below target levels, especially as ambient conditions, inlet pressure loss or exhaust back pressure vary. In addition, the process 34 allows for smooth transitions in the operation of the gas turbine as changes occur in ambient conditions and in inlet pressure loss and back pressure variations.

Figure 3:
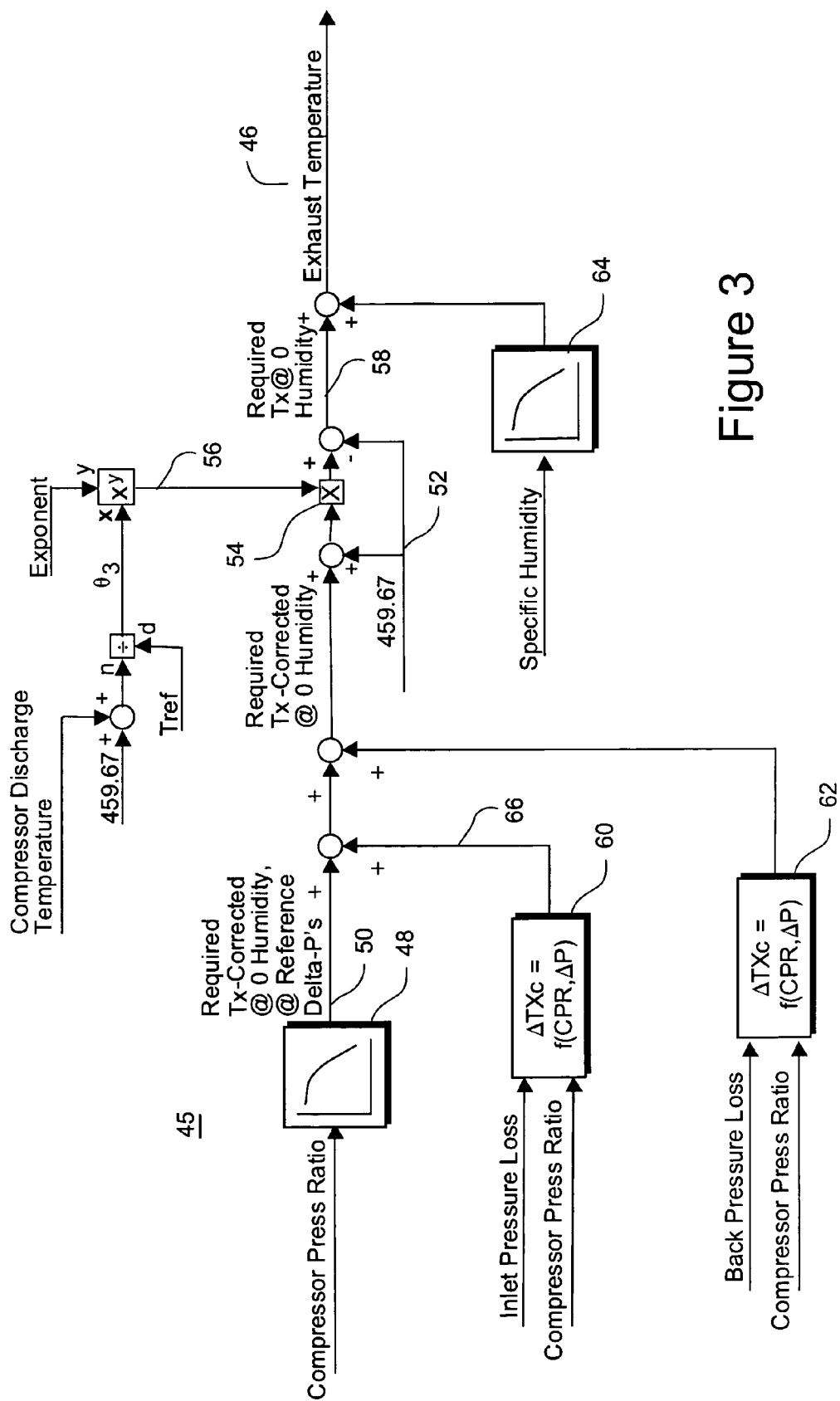
FIG. 3 is a block diagram of one exemplary algorithm for determining a target turbine exhaust temperature.

FIG. 3 is a schematic diagram of an algorithm 45 that is representative of each of the algorithms 36, 38, 40 and 42 that produce a target turbine exhaust temperature 46. The NOx, CO and Tfire limiting algorithms and the Tfire Target algorithm each having their own unique schedules and correction factor exponent, but are otherwise similar and represented by algorithm 45. The algorithms receive input data regarding such as, for example, the current compressor pressure ratio, the specific humidity of the ambient air entering the compressor 12, the pressure lost of ambient air passing through the inlet duct 20, and the back pressure on the turbine exhaust gas due to the exhaust duct 22. Based on these inputs, the NOx, CO and Tfire limiting algorithms 36, 38 and 42, and the Tfire Target algorithm each produced a desired target exhaust temperature 46.

The representative algorithm 45 includes a schedule 48 for applying the compressor pressure ratio to derive a corrected turbine exhaust temperature 50. The compressor pressure ratio vs. exhaust temperature target schedule 48 may be a graph, look-up table or function that correlates the compressor pressure ratio to a corrected exhaust temperature target. The schedule 48 is generated for each gas turbine or gas turbine class in a conventional manner that is outside the scope of the present invention. The schedule 48 yields a corrected exhaust temperature, for a defined reference load and ambient conditions, e.g., humidity and temperature.

The desired turbine exhaust temperature is influenced by the load on the gas turbine and the ambient humidity and temperature. However, a schedule that itself takes into account load, ambient humidity and temperature, and compressor ratio would be complex and could be difficult to apply in a controller. To simplify the compressor schedule 48, the schedule was prepared assuming that the load and ambient temperature and humidity are each at a defined condition. By defining certain conditions, the compressor schedule 48 is reduced to having a single input variable, which is the compressor ratio. Because the effects of load and ambient temperature and humidity are assumed to be constant at the defined conditions, the output of the schedule is a "corrected exhaust temperature."

To derive the desired actual exhaust temperature, the corrected exhaust temperature is adjusted to account for the load and ambient temperature and humidity. The corrected exhaust temperature 50 (after being adjusted to account for compressor inlet pressure loss and exhaust back pressure) is converted to an absolute temperature level, such as degrees Rankine in step 52. A temperature in Fahrenheit may be converted to Rankine by adding 459.67 degrees. The absolute temperature is multiplied (step 54) by a correction factor 56 which is a function ($X^y$) of a correction factor exponent (y) and a compressor temperature ratio (X). The correction factor exponent (y) may be empirically derived, and be specific to each algorithm 36, 38, 40 and 42 and to each class of gas turbine. The compressor temperature ratio (X) is an indication of gas turbine load. The compressor temperature ratio is the current compressor discharge temperature over a reference compressor temperature (Tref), such as the compressor temperature at full gas turbine load. The temperatures applied for the compressor temperature ratio are absolute temperatures. By multiplying the function ($X^y$) and the corrected target exhaust temperate, an uncorrected target exhaust temperature 58, converted to a non-absolute temperature scale, is generated.

The corrected turbine exhaust temperature 50 output from the compressor pressure ratio schedule 48 does not account for deviations in the compressor inlet pressure loss, exhaust back pressure loss or changes in ambient humidity. Additional schedules, 60, 62 and 64 are applied to adjust the target turbine exhaust temperature for changes in these conditions. The schedule 60 for the inlet pressure loss may be a function that correlates a delta exhaust temperature to the actual compressor pressure ratio and the compressor inlet pressure loss (or the change between actual inlet pressure loss and the defined inlet pressure loss applied in developing the compressor schedule 48.). The inlet pressure loss schedule 60 is a function of compressor ratio because the pressure loss is a function of corrected flow through the gas turbine and does vary with the load on the gas turbine. The delta exhaust temperature value 66 output from the inlet pressure loss schedule 60 is a corrected temperature value. Accordingly, the delta exhaust temperature value 66 is summed with the target corrected exhaust temperature 50 derived from the compressor schedule 48.

Similarly, the back pressure schedule 62 produces a delta value for the corrected exhaust temperature 50 based on a function of the compressor pressure ratio and the actual back pressure (or the change between actual back pressure and the defined back pressure applied in developing the compressor schedule 48.). The back pressure schedule 62 is a function of compressor ratio because the turbine back pressure loss is a function of corrected flow through the gas turbine and does vary with the load on the gas turbine.

The humidity schedule 64 is of exhaust temperature delta versus delta specific humidity. The delta specific humidity is the difference in the actual ambient humidity from a predefined level of humidity. The exhaust temperature delta is applied to the uncorrected target exhaust temperature and is summed with that temperature value 58. The schedule 64 is applied to determine the temperature difference to be used to adjust the corrected exhaust temperature. The temperature difference may be a positive or negative value. The schedule 64 provides an exhaust temperature delta for a delta compressor inlet pressure loss, where the delta compressor inlet pressure loss is the difference between the inlet pressure loss and the defined inlet pressure loss. The schedule 50 provides an exhaust temperature delta for a delta exhaust back-pressure, where the delta exhaust back-pressure is the difference between the actual back-pressure and the defined back-pressure. The result is a target exhaust temperature 46 for the subject parameter (NOx, CO, or T-fire).

FIG. 4 is an expanded schematic diagram that compresses the information from FIG. 3 into the blocks for each of the algorithms shown in FIG. 2. FIG. 4 shows that the representative algorithm 45 is tailored to and applied to each of the algorithms 36, 38, 40 and 48. The selection logic 44 may include a maximum select logic unit 68 that identifies the hottest temperature between the target exhaust 46 from the CO limiting algorithm 38 and the Tfire Target Algorithm 40. The hottest temperature identified by the maximum select 68 is applied to a minimum select logic unit 70 that identifies the coolest of the temperatures output from the maximum select logic unit 68, the uncorrected target exhaust levels from the NOx limiting algorithm and the Tfire limiting algorithm, and a maximum exhaust temperature level 72. The output of the minimum select unit 70 is applied as the uncorrected target turbine exhaust level 74. The controller 18 adjusts the fuel control to achieve the target turbine exhaust level 74.

The selection logic 44 also provides smooth transition in target turbine exhaust during a transition from one selected limiting algorithm to the selection of another algorithm as operating conditions change. The selection of the exhaust target levels indirectly dictates the required combustor firing temperature and the level of the alternate emission when the schedule is in force.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A controller in a gas turbine having a compressor, combustor and turbine, said controller comprising:
   a sensor input receiving data regarding an actual turbine exhaust temperature, a compressor pressure ratio level, a compressor pressure inlet loss, a turbine back pressure level and ambient humidity;
   a processor executing a program, wherein said program further comprises: a compressor schedule for generating a first target exhaust temperature based on the compressor pressure ratio level, and at least one additional schedule for generating a temperature change to be applied to the first target turbine exhaust temperature wherein the temperature change is derived from at least one parameter of a group of parameters consisting of specific humidity, compressor inlet pressure loss and the turbine back pressure level, and wherein said processor outputs a modified target exhaust temperature based on the first target exhaust temperature and the temperature change, and said controller outputs a combustor control signal based on the modified target exhaust temperature.

2. A controller as in claim 1 wherein the at least one additional schedule includes a humidity verses delta target exhaust temperate schedule having an input indicative of the ambient humidity.

3. A controller as in claim 1 wherein the at least one additional schedule includes a compressor inlet pressure loss verses delta target exhaust temperate schedule having inputs indicative of the compressor pressure ratio level and the compressor pressure inlet loss.

4. A controller as in claim 1 wherein the at least one additional schedule includes a turbine back pressure verses delta target exhaust temperate schedule having inputs indicative of the compressor pressure ratio level and the back pressure level.

5. A controller as in claim 1 further comprising a combustion controller outputting the combustor control signal.

6. A system for determining a target exhaust temperature for a gas turbine comprising:

means for determining a target exhaust temperature based on a compressor pressure condition;

means for determining a temperature adjustment to the target exhaust temperature based on at least one parameter of a group of parameters consisting of specific humidity, compressor inlet pressure loss and turbine exhaust back pressure, and means for adjusting the target exhaust temperature by applying the temperature adjustment.

7. A system as in claim 6 wherein the means for determining the temperature adjustment applies a schedule having a delta specific humidity input and a delta exhaust temperature output, wherein the delta specific humidity input is a difference between an actual specific humidity at an inlet to the gas turbine and a predefined specific humidity level, and the delta exhaust temperature output is a temperature difference to be summed with the target exhaust temperature.

8. A system as in claim 6 wherein the means for determining the temperature adjustment applies a schedule having inputs of delta inlet pressure loss and the current compressor condition, and an output of a delta exhaust temperature output, wherein the delta inlet pressure loss input is a difference between an actual inlet pressure loss to the gas turbine and a predefined inlet pressure loss level, and the delta exhaust temperature output is a temperature difference to be summed with the target exhaust temperature.

9. A system as in claim 6 wherein the means for determining the temperature adjustment applies a schedule having inputs of delta back pressure and the current compressor condition, and an output of a delta exhaust temperature output, wherein the delta back pressure input is a difference between an actual back pressure to the gas turbine and a predefined back pressure level, and the delta exhaust temperature output is a temperature difference to be summed with the target exhaust temperature.

10. A system as in claim 6 wherein the target exhaust temperature is applied by a gas turbine controller to determine a turbine firing temperature.

11. A system as in claim 6 wherein the target exhaust temperature is applied by a gas turbine controller to determine a fuel flow to a combustor of the gas turbine.

12. A system in claim 6 wherein the compressor pressure condition is compressor pressure ratio.

13. A controller in a gas turbine having a compressor, combustor and turbine, said controller comprising:

a input receiving data regarding a sensed turbine exhaust temperature, a compressor pressure ratio level, a compressor pressure inlet loss, a turbine back pressure level and ambient humidity;

a processor executing a program, wherein said program further comprises: a compressor schedule for generating a first target exhaust temperature based on the compressor pressure ratio level and at least one additional schedule for generating a temperature change to be applied to the first target turbine exhaust temperature wherein the temperature change is derived from at least one parameter of a group of parameters consisting of specific humidity, compressor inlet pressure loss and turbine back pressure level, and wherein said processor outputs a modified target exhaust temperature based on the first target exhaust temperature and the temperature change, and said controller outputs a combustor control signal based on the modified target exhaust temperature.

14. A controller as in claim 13 wherein said controller further comprises a combustion controller outputting the combustor control signal based on the modified target exhaust temperature.

15. A controller as in claim 13 wherein the at lease one additional schedule further comprises a delta specific humidity input and a delta exhaust temperature output, wherein the delta specific humidity input is a difference between an actual specific humidity at an inlet to the gas turbine and a predefined specific humidity level, and the delta exhaust temperature output is a temperature difference summed with the adjusted target turbine exhaust temperature.

16. A controller as in claim 13 wherein the at lease one additional schedule further comprises inputs of delta inlet pressure loss and the current compressor pressure ratio and an output of a delta exhaust temperature output, wherein the delta inlet pressure loss input is a difference between an actual inlet pressure loss to the gas turbine and a predefined inlet pressure loss level, and the delta exhaust temperature output is summed with target turbine exhaust.

17. A controller as in claim 13 wherein the at least one additional schedule further comprises inputs of delta back pressure and the current compressor condition, and an output of a delta exhaust temperature output, wherein the delta back pressure input is a difference between an actual back pressure to the gas turbine and a predefined back pressure level, and the delta exhaust temperature output is summed with target turbine exhaust.

18. A controller as in claim 13 wherein the target turbine exhaust temperature is applied by the controller to determine a turbine firing temperature.

19. A controller as in claim 13 wherein the target turbine exhaust temperature is applied by the controller to determine a fuel flow to a combustor of the gas turbine.

20. A controller as in claim 13 wherein said gas turbine is an industrial gas turbine.

* * * * *

UNITED STATES PATENT AND TRADEMARK OFFICE
CERTIFICATE OF CORRECTION

PATENT NO. : 7,100,357 B2 Page 1 of 1
APPLICATION NO. : 11/075756
DATED : September 5, 2006
INVENTOR(S) : Rex Morgan et al.

It is certified that error appears in the above-identified patent and that said Letters Patent is hereby corrected as shown below:

Column 4, line 30, delete "Co" and insert --CO--.

Signed and Sealed this

Twenty-sixth Day of December, 2006

JON W. DUDAS
*Director of the United States Patent and Trademark Office*